(12) United States Patent
Togawa et al.

(10) Patent No.: US 7,743,862 B2
(45) Date of Patent: Jun. 29, 2010

(54) RESERVE TANK STRUCTURE

(75) Inventors: Taeko Togawa, Saitama (JP); Takahiro Yanagisawa, Saitama (JP); Makoto Hotozuka, Saitama (JP); Masayuki Hirukawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 383 days.

(21) Appl. No.: 11/699,017

(22) Filed: Jan. 29, 2007

(65) Prior Publication Data

US 2007/0175824 A1 Aug. 2, 2007

(30) Foreign Application Priority Data

Jan. 31, 2006 (JP) .............................. 2006-022935

(51) Int. Cl.
*B60K 11/00* (2006.01)

(52) U.S. Cl. ................... 180/68.4; 123/41.48; 220/563; 180/229

(58) Field of Classification Search ................. 220/562, 220/563, 564; 123/41.3, 41.43, 41.51; 210/618; 180/68.4, 229; 280/830, 833
See application file for complete search history.

(56) References Cited

U.S. PATENT DOCUMENTS

| 4,744,433 | A | | 5/1988 | Takeuchi et al. |
| 4,953,631 | A | * | 9/1990 | Kimura ........................ 165/41 |
| 6,360,839 | B1 | * | 3/2002 | Urano et al. ................. 180/229 |
| 6,547,019 | B2 | * | 4/2003 | Maeda et al. ............... 180/68.4 |
| 6,800,389 | B2 | * | 10/2004 | Hirakata ....................... 429/26 |
| 2005/0102918 | A1 | * | 5/2005 | Richardson et al. .......... 52/79.1 |
| 2006/0113815 | A1 | * | 6/2006 | Ohzono ..................... 296/37.1 |

FOREIGN PATENT DOCUMENTS

JP 62-76795 U * 5/1987

* cited by examiner

*Primary Examiner*—Paul N Dickson
*Assistant Examiner*—Erez Gurari
(74) *Attorney, Agent, or Firm*—Birch, Stewart, Kolasch & Birch, LLP (57) ABSTRACT

A reserve tank structure for enhancing the degree of freedom in the layout of the filling portion of the reserve tank and the mounting bracket and the degree of freedom in the layout of parts around the reserve tank. A reserve tank structure includes a reserve hose for connecting a reserve tank to a radiator. The reserve tank includes a tank body portion for reserving a cooling water with a filling portion that extends upwardly from the tank body portion and includes a water supply port on an upper end thereof. A hose plug is connected to an end portion of the reserve hose. Mounting brackets support an intermediate portion of the reserve hose wherein the mounting bracket is mounted on the filling portion.

20 Claims, 6 Drawing Sheets

RESERVE TANK STRUCTURE

CROSS-REFERENCE TO RELATED APPLICATIONS

The present application claims priority under 35 USC 119 to Japanese Patent Application No. 2006-022935 filed on Jan. 31, 2006 the entire contents of which are hereby incorporated by reference.

BACKGROUND OF THE INVENTION

1. Field of the Invention

The present invention relates to a reserve tank structure wherein a reserve tank is connected to a radiator by way of a reserve hose.

2. Description of Background Art

A radiator cools cooling water by using an air current and by using a fan to create a flow of air over the radiator. The radiator is mounted on a vehicle that includes a water-cooled engine. A reserve tank, that can supply or discharge the cooling water for adjusting an amount of water, is connected to the radiator by way of a reserve hose. See, for example, JP-A-62-76795.

A reserve tank which is described in JP-A-62-76795 includes a tank body portion which reserves cooling water and a filling portion which includes a water supply port formed in an upper end thereof. Further, a plurality of mounting brackets, that support the reserve hose, are mounted on an outer peripheral portion of the tank body portion in a projecting manner.

In the structure of the reserve tank described in JP-A-62-76795, in addition to a filling port, a plurality of mounting brackets are formed on an outer peripheral portion of the tank body portion in a projecting manner. Thus, it is necessary to adopt a layout which can obviate the interference of the filling portion and the mounting brackets with each other. Accordingly, the layout of the filling portion and the mounting brackets is restricted. Further, the layout of parts around the filling portion which are required to obviate the interference with the filling port and the mounting brackets is also restricted.

SUMMARY AND OBJECTS OF THE INVENTION

The present invention has been made under such circumferences and it is an object of an embodiment of the present invention to provide the reserve tank structure which can enhance the degree of freedom in the layout of a filling portion of a reserve tank and a mounting bracket and the degree of freedom in the layout of parts around the reserve tank.

To achieve the above-mentioned objects, an embodiment of the present invention is directed to the reserve tank structure which includes a reserve tank that is connected to a radiator by way of a reserve hose. The reserve tank includes a tank body portion which reserves cooling water, a filling portion which extends upwardly from the tank body portion and includes a water supply port on an upper end thereof, a hose plug to which an end portion of the reserve hose is connected, and a mounting bracket which supports the reserve hose. The mounting bracket is mounted on the filling portion.

According to an embodiment of the present invention, a recessed portion is formed in an outer peripheral portion of the filling portion and the mounting bracket is mounted in the recessed portion.

According to an embodiment of the present invention, a support portion for supporting the reserve tank on a vehicle body side is arranged in the vicinity of the mounting bracket which is mounted on the filling portion.

According to an embodiment of the present invention, the support portion is supported on a vehicle-body-side stay and a distal end portion of the support portion includes a tapered portion which is tapered toward a tip end thereof and a removal-preventing bulging portion.

According to an embodiment of the present invention, the reserve tank is arranged below the radiator and an atmospheric pressure port which is communicated with an atmosphere side and maintains a pressure in the inside of the reserve tank at an atmospheric pressure is mounted on an upper surface of the tank body portion in an obliquely and upwardly projecting manner.

According to an embodiment of the present invention, the mounting bracket which supports the reserve hose is mounted on the filling portion which extends upwardly from the tank body portion and includes the water supply port on the upper end thereof. Thus, it is unnecessary to adopt a layout which obviates an interference between the filling portion and the mounting bracket whereby the degree of freedom in the layout of the filling portion and the mounting bracket of the reserve tank can be enhanced. Further, it is possible to reduce the number of mounting brackets which are mounted on the tank body portion. Thus, the degree of freedom in the layout of the parts around the reserve tank can be also enhanced.

According to an embodiment of the present invention, the recessed portion is formed in the outer peripheral portion of the filling portion and the mounting bracket is mounted in the recessed portion. Thus, it is possible to suppress a projection amount of the mounting bracket from the outer peripheral portion of the filling portion to the outside. Accordingly, it is possible to further enhance the degree of freedom in layout including the arrangement of the mounting brackets close to the parts around the reserve tank.

According to an embodiment of the present invention, the reserve tank is supported on the vehicle body side by way of the support portion which is arranged in the vicinity of the mounting bracket which is mounted on the filling portion. Thus, it is possible to effectively suppress the swinging of the filling portion and, at the same time, it is possible to effectively suppress the movement of the reserve hose.

According to an embodiment of the present invention, the distal end portion of the support portion which is supported on the vehicle-body-side stay has a tapered shape which is tapered toward a tip end thereof. Thus, the mounting of the support portion on the vehicle-body-side stay is facilitated. Further, the distal end portion of the support portion includes the removal-preventing bulging portion. Thus, it is possible to make the removal of the support portion from the stay difficult. Accordingly, the support portion can be easily mounted on the stay and, at the same time, it is possible to ensure a mounting state of the support portion.

According to an embodiment of the present invention, an atmospheric pressure port is in communication with an atmosphere side and maintains a pressure in the inside of the reserve tank at an atmospheric pressure. The atmospheric pressure port is mounted on the upper surface of the tank body portion in an obliquely and upwardly projecting manner. Thus, even when the reserve tank is arranged below the radiator, it is possible to arrange the reserve tank close to the radiator and, at the same time, the hose can be easily pulled around when the hose is connected to the atmospheric pressure port.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, one embodiment of the present invention is explained in conjunction with drawings. Here, the directions of "front," "rear," "left" and "right" in the explanation made hereinafter are assumed to be equal to the corresponding directions of "front," "rear," "left" and "right" with respect to the advancing direction of the vehicle at the time of advancing the vehicle.

Figure 1:
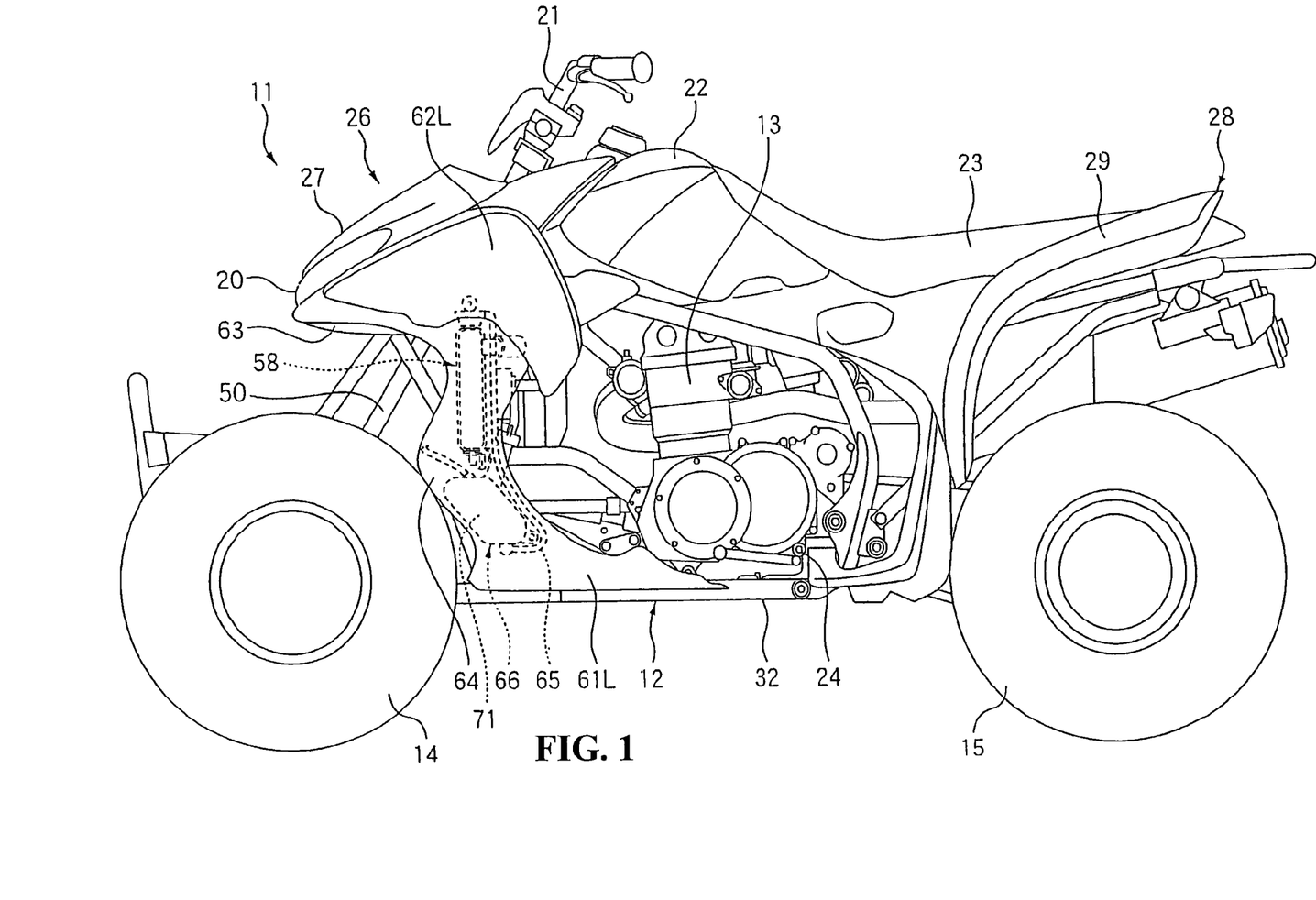
FIG. 1 is a side view showing a whole structure of a saddle-ride type vehicle to which the reserve tank structure according to the present invention is applied.

FIG. 1 is a side view showing a saddle-ride type vehicle to which the reserve tank structure of the present invention is applied. The saddle-ride type vehicle 11 is an all terrain vehicle that mainly travels on a rough terrain, a so-called buggy. The saddle-ride type vehicle 11 includes a vehicle body frame 12 which constitutes a skeleton of the saddle-ride type vehicle 11 and includes pipe members, a water-cooled type engine 13 which is arranged at a substantially center position of the vehicle body frame 12 in the longitudinal direction, front wheels 14 which are supported on the vehicle body frame 12 in a vertically rockable and laterally steerable manner and are arranged on both left and right sides of a front portion of the vehicle body (only the left side front wheel 14 being shown in FIG. 1), and rear wheels 15 which are supported on the vehicle body frame 12 in a vertically rockable manner and are arranged on both left and right sides of a rear portion of the vehicle body (only the left side rear wheel 15 being shown in FIG. 1).

The saddle-ride type vehicle 11 includes a head light 20 which is arranged at a center of the front portion of the vehicle body, a handle rod 21 which is arranged above the front side of the vehicle body so as to extend in the lateral direction for steering the front wheels 14, a fuel tank 22 which is mounted above the center in the longitudinal direction of the vehicle body, a seat 23 which is mounted on a rear side of the fuel tank 22, steps 24 which are mounted on both left and right sides of the engine 13 and the like.

In the saddle-ride type vehicle 11, a body cover 26 which constitutes a surface side of the saddle-ride type vehicle 11 includes a front cover 27 which is arranged to cover the front portion of the vehicle body from above while surrounding a periphery of the head light 20 which is arranged at the center of the front portion of the vehicle body. Rear covers 28 are integrally mounted on the seat 23 and are arranged to cover the rear portion of the vehicle body from above. The rear cover 28 includes rear fenders 29 which cover the rear wheels 15.

Figure 2:
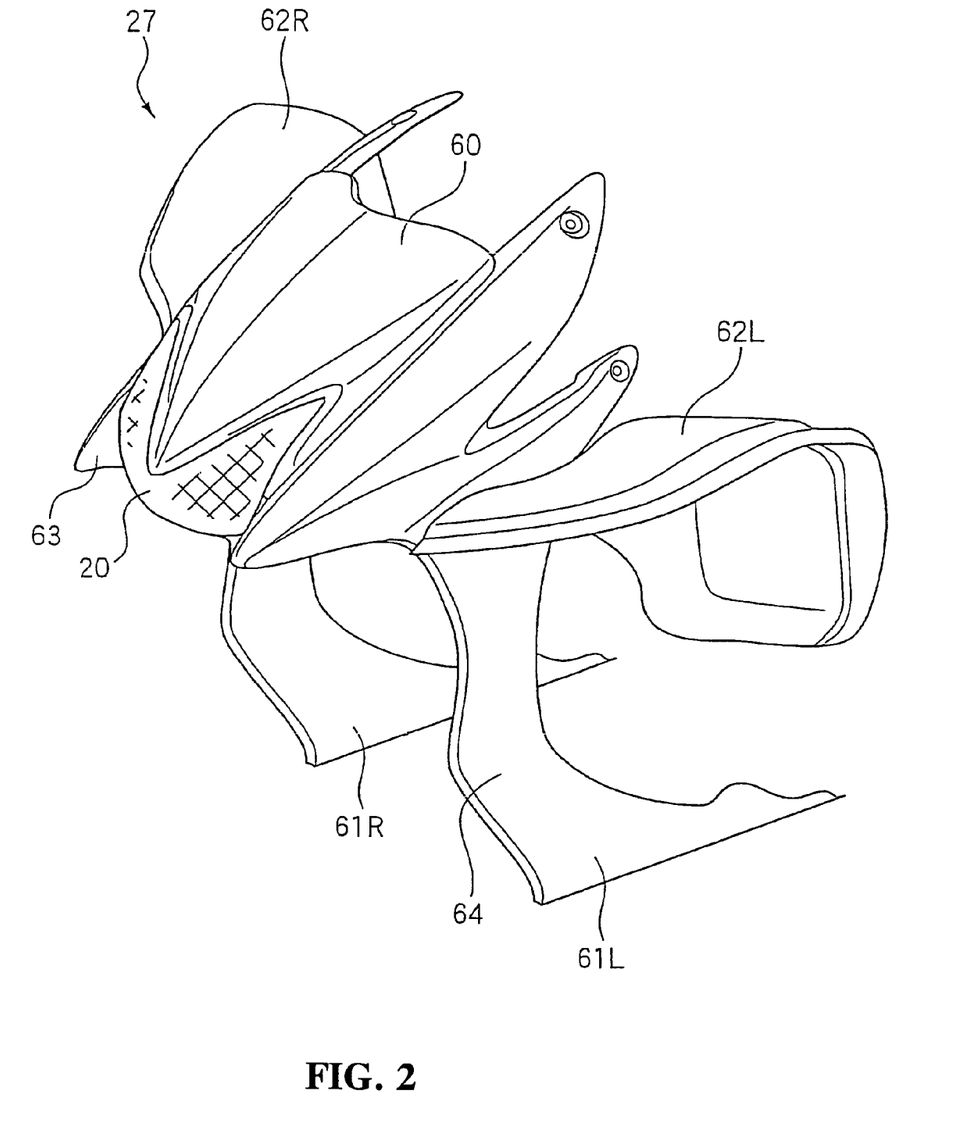
FIG. 2 is a perspective view showing a front cover in FIG. 1.

As shown in FIG. 2, the front cover 27 includes a front center cover 60 which extends rearwardly while covering the head light 20 from above. A left shroud 61L is mounted on a left side of the front portion of the vehicle body and extends downwardly while covering the head light 20 from a left side and, further, extends rearwardly from a lower portion. A right shroud 61R is mounted on a right side of the front portion of the vehicle body and extends downwardly while covering the head light 20 from a right side and, further, extends rearwardly from a lower portion. A left fender 62L is mounted on a left side of the left shroud 61L and covers the left front wheel 14 from above and behind. A right fender 62R is mounted on a right side of the right shroud 61R and covers the right front wheel from above and behind. A front under cover 63 covers the spaces between the head light 20 and the left shroud 61L and between the head light 20 and the right shroud 61R while covering the head light 20 from below.

The front cover 27 is divided into the front center cover 60, the left shroud 61L, the right shroud 61R, the left fender 62L, the right fender 62R and the front under cover 63, and is formed of an integrally molded product which is constituted of the above-mentioned members which are respectively made of a synthetic resin material.

Figure 3:
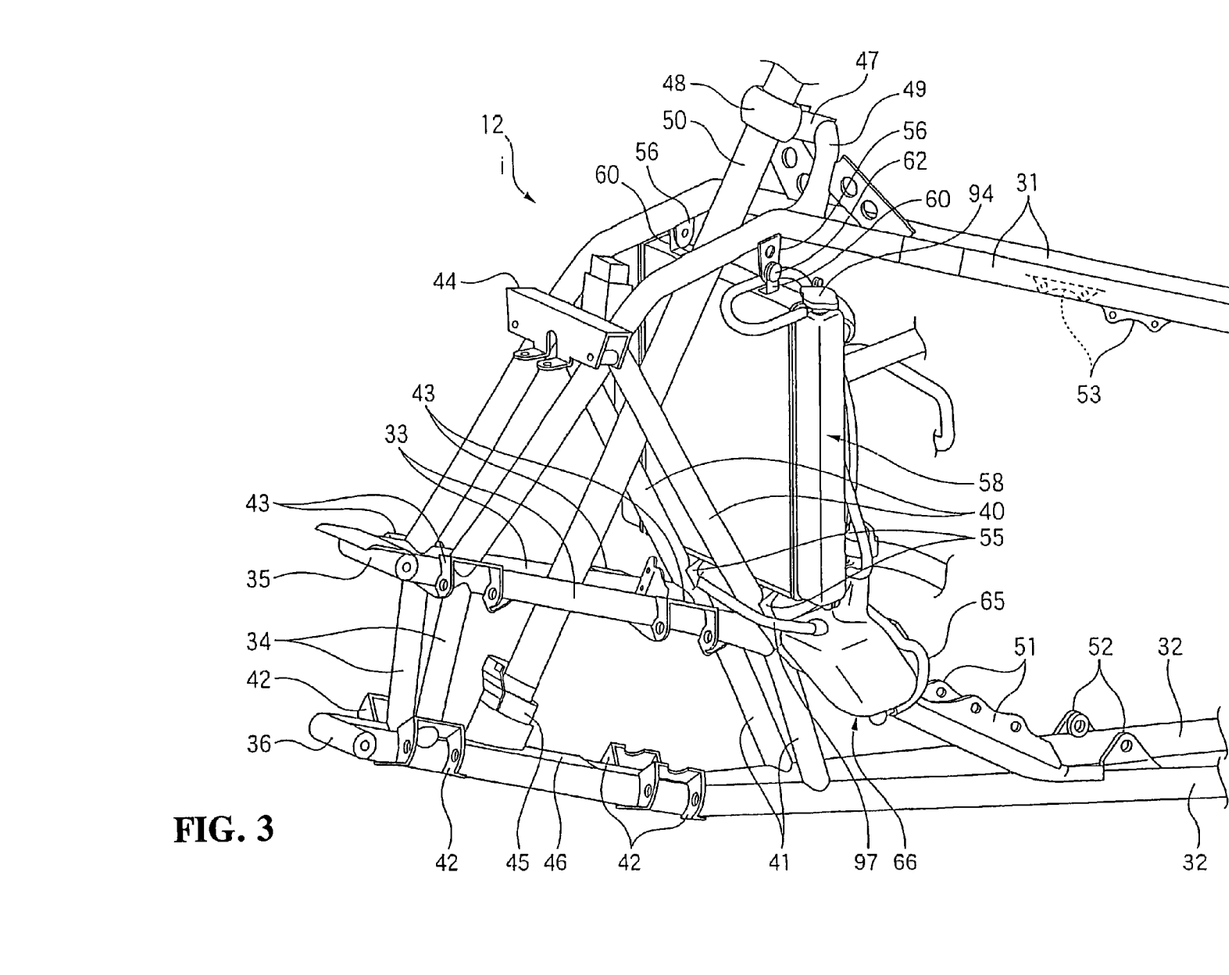
FIG. 3 is a perspective view showing a vehicle body frame at a front portion of the saddle-ride type vehicle.

As shown in FIG. 3, the vehicle body frame 12 includes a pair of left and right upper pipes 31 which is arranged at an upper portion of the vehicle body along the longitudinal direction and, at the same time, has a front portion thereof inclined forwardly and downwardly. A pair of left and right main pipes 32 is arranged at a lower portion of the vehicle body along the longitudinal direction. A pair of left and right front pipes 33 extends in the slightly frontward and upward direction and is branched from the pair of left and right main pipes 32. Here, front ends of the pair of left and right upper pipes 31 are connected to front ends of the pair of left and right front pipes 33.

The vehicle body frame 12 includes a pair of left and right front arm pipes 34 which is arranged on an extension of the upper pipes 31 and has upper end portions thereof connected to lower sides of the pair of left and right front pipes 33 and lower end portions thereof connected to front end sides of both main pipes 32. A front cross pipe 35 extends in the lateral direction so as to connect front end portions of both front pipes 33. A front cross pipe 36 extends in the lateral direction so as to connect front end portions of a pair of left and right main pipes 32.

In addition, the vehicle body frame 12 includes a pair of left and right down pipes 40 which has upper end portions thereof connected to the pair of left and right upper pipes 31 at front predetermined positions above the front pipes 33 that extend rearwardly and downwardly and has lower end portions thereof connected to intermediate portions of the pair of left and right front pipes 33. A pair of left and right front sub pipes 41 are connected to the pair of left and right front pipes 33 and the pair of left and right main pipes 32 to be arranged on an extension of the down pipes 40.

Further, in the vehicle body frame 12, front lower arm brackets 42 for respectively supporting suspension arms not shown in the drawing for the front wheel 14 are fixed to the pair of left and right main pipes 32 in the longitudinal direction. In addition, front upper arm brackets 43 for respectively supporting suspension arms for the front wheel 14 are fixed to the pair of left and right front pipes 33 in the longitudinal direction. A front shock absorber bracket 44, that extends in the lateral direction and supports a shock absorber for the front wheel 14, is fixed to the upper pipes 31 at portions thereof in front of connection positions where the upper pipes 31 are connected with the down pipes 40.

In the vehicle body frame 12, a front across plate 46 which supports a steering bottom holder 45 extends between both main pipes 32, and a steering holder pipe 49 which supports a steering holder 48 by way of a steering holder bracket 47 extends between both upper pipes 31. Further, a steering shaft 50 which is connected to the above-mentioned handle rod 21 is rotatably supported by the steering bottom holder 45 and the steering holder 48.

In the vehicle body frame 12, engine-mount front brackets 51 are fixed to rear end sides of both front pipes 33 and engine-mount lower brackets 52 are fixed to portions of both main pipes 32 slightly behind positions where the front pipes 33 are connected to both main pipes 32. Further, engine upper brackets 53 are fixed to portions of both upper pipes 31 at positions above the engine mount lower brackets 52. On the vehicle body frame 12, the engine 13 (see FIG. 1) is mounted by way of the engine mount front brackets 51, the engine mount lower brackets 52 and the engine upper brackets 53.

Figure 4:
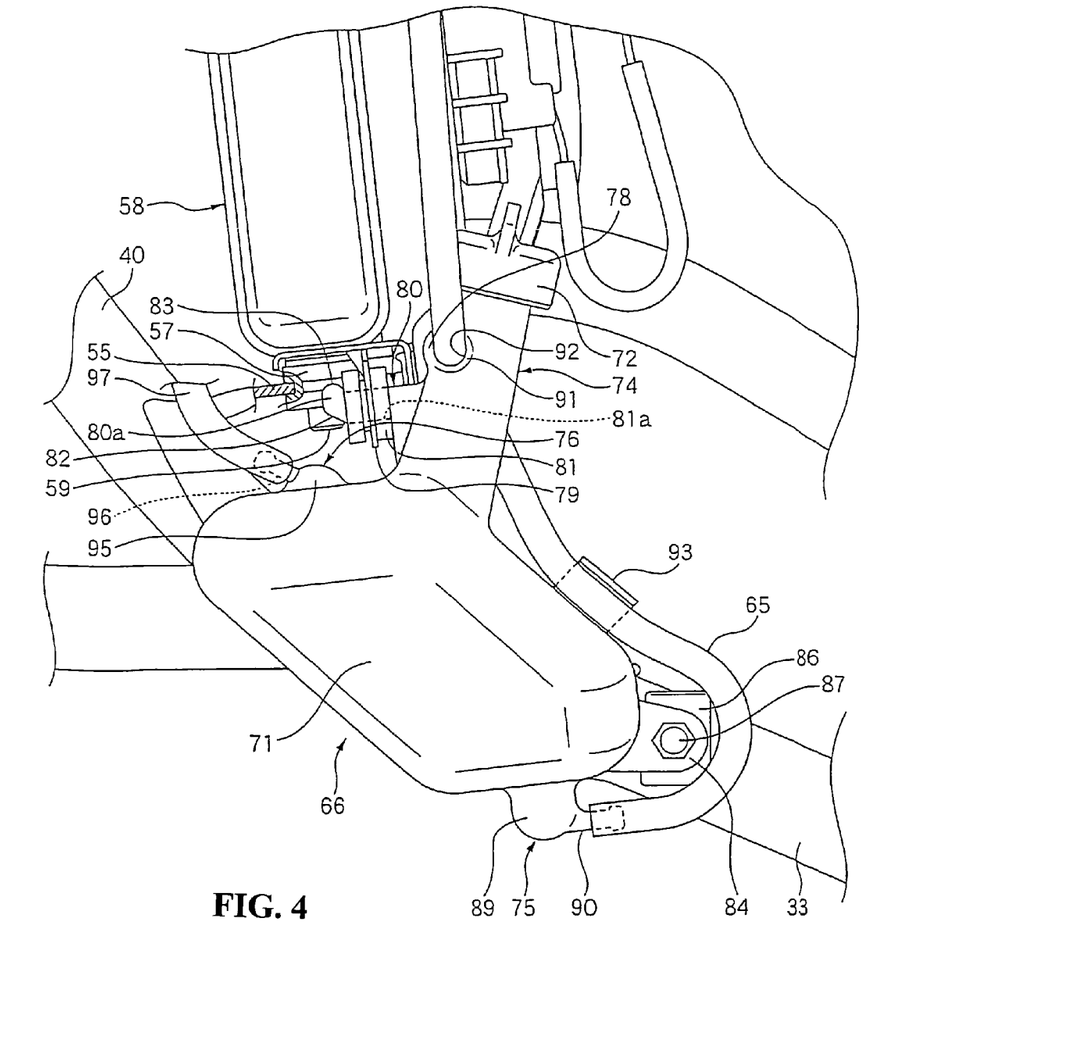
FIG. 4 is a left side view showing the structure in the vicinity of the reserve tank with a state that a left shroud is removed.

In the vehicle body frame 12, radiator stays 55 are fixed to both down pipes 40 in the vicinity of a position where both down pipes 40 are connected with the front pipes 33, while radiator stays 56 are fixed to both upper pipes 31 in the vicinity of positions where both down pipes 40 and the steering shaft 50 cross each other. Further, as shown in FIG. 4, both left and right fitting shaft portions 59, which are formed on a lower portion of the radiator 58 for cooling the cooling water for the engine 13, are inserted into a grommet 57 made of an annular resilient material that is mounted on both lower radiator stays 55. Further, as shown in FIG. 3, left and right mounting portions 60 which are formed on an upper portion of the radiator 58 are fixed to both upper radiator stays 56 using bolts 62. In this manner, the radiator 58 is supported on both upper pipes 31 and both down pipes 40 of the vehicle body frame 12, while the radiator 58 is supported on the vehicle body frame 12 in front of the engine 13 as shown in FIG. 1.

As shown in FIG. 3, below the radiator 58 and on a left side which constitutes one side of the lateral direction, there is provided a reservoir tank 66 which is connected with the radiator 58 by way of a reservoir hose 65 for performing the supply and the discharge of cooling water between the reserve tank 66 and the radiator 58.

Figure 5:
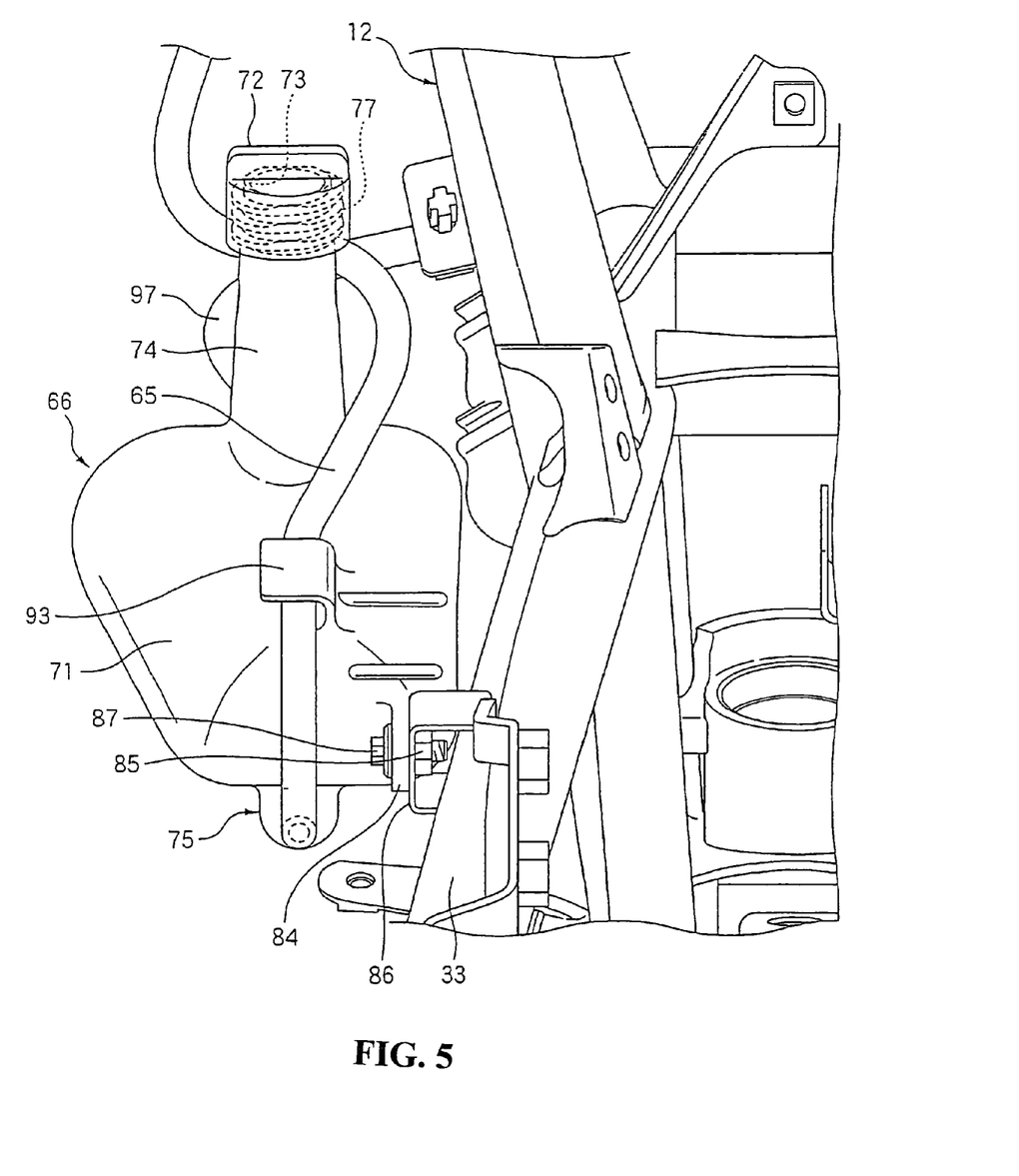
FIG. 5 is a back view showing the structure in the vicinity of the reserve tank.

The reserve tank 66 is an integrally molded product made of a synthetic resin. As shown in FIG. 4 and FIG. 5, the reservoir tank 66 includes a container-like tank body portion 71 which reserves cooling water, an approximately tapered cylindrical filling portion 74 which extends upwardly from the tank body portion 71 and has a water supply port 73 (see FIG. 5) which is closed by a cap 72 on an upper end thereof, a hose plug 75 which is mounted on a lower surface of the tank body portion 71 and allows the connection of an end portion of the reserve hose 65 thereto, and an atmospheric pressure port 76 which is mounted on an upper surface of the tank body portion 71 in front of the filling portion 74 in an obliquely and upwardly projecting manner and is in communication with an atmospheric side so as to maintain the pressure in the inside of the reserve tank 66 at an atmospheric pressure.

The tank body portion 71 is formed in an approximately parallel rectangular shape as viewed in a side view, wherein a front surface and a rear surface of the tank body portion 71 are inclined along a shape of a rearwardly and downwardly extending intermediate portion 64 of a left shroud 61L of the front cover 27. Due to such a construction, the tank body portion 71 is arranged not to be exposed from a side due to the left-side shroud 61L (see FIG. 1).

Further, the filling portion 74 extends upwardly while being slightly outwardly inclined from a laterally intermediate portion of the tank body portion 71 at a boundary position between an upper surface and a rear surface of the tank body portion 71. A threaded portion 77 (see FIG. 5) for allowing the thread engagement of a cap 72 therewith is formed on an outer peripheral surface of an upper portion of the filling portion 74. A mounting bracket 78, for supporting an intermediate portion of the reserve hose 65, is mounted on an intermediate front side of the filling port 74. A support portion 80 is supported on a stay 79 of the radiator 58 which is arranged on a vehicle body side below and in front of the filling portion 74 which is positioned in the vicinity of the mounting bracket 78 in a frontwardly projecting manner.

The stay 79 extends downwardly from a lower portion of the radiator 58, and a grommet 81, which is made of an annular resilient material, is mounted in a mounting hole not shown in the drawing which is formed in the stay 79. By inserting the support portion 80 formed on the filling portion 74 into the through hole 81a of the grommet 81 from behind, a distal end portion 80a of the support portion 80 is resiliently supported in a projecting manner from the grommet 81. Further, the distal end portion 80a of the support portion 80 includes a tapered portion 82 which is tapered downwardly with an inclined surface. In addition, a bulging portion 83 is formed for projecting upwardly from a columnar portion of the support portion 80 for preventing the removal thereof. The distal end portion 80a of the support portion 80 is easily inserted into the inside of the through hole 81a of the grommet 81 due to the tapered portion 82 thus facilitating the mounting of the support portion 80 on the stay 79. Further, the bulging portion 83, after mounting the support portion 80, assumes a position at which the bulging portion 83 is overlapped to the grommet 81 in the radial direction thus making the removal of the support portion 80 from the grommet 81 difficult.

On a lower portion of a rear surface of the tank body portion 71, a mounting lug portion 84 is formed in a rearwardly extending manner. A mounting hole not shown in the drawing penetrates in the lateral direction and is formed in the mounting lug portion 84. On the other hand, as shown in FIG. 5, outside the left front pipe 33, an approximately U-shaped bracket 86 is arranged for mounting a welded nut 85 on an inner surface thereof. The mounting lug portion 84 of the reserve tank 66 is fixed to the bracket 86 of the front pipe 33 by, in a state that the mounting lug portion 84 is brought into contact with an outer surface of the bracket 86, threadedly engaging a bolt 87 into the welded nut 85 through a mounting hole formed in the mounting lug portion 84 from the outside.

Accordingly, the reserve tank 66 can be mounted on the vehicle body side by inserting the distal end portion 80a of the support portion 80 into the inside of the through hole 81a of the grommet 81, by supporting the support portion 80 on the stay 79 of the radiator 58 by way of the grommet 81 and by fixing the mounting lug portion 84 to the bracket 86 mounted on the front pipe 33.

The hose plug 75 includes a base portion 89 which is formed into a dome shape by bulging a lower surface of the tank body portion 71 downwardly. A tubular connection portion 90 extends rearwardly from a lower portion of the base portion 89. By inserting one end portion of the reserve hose 65 into the connection portion 90, it is possible to connect one end portion of the reserve hose 65 to the hose plug 75. By mounting the hose plug 75 on the lower portion of the tank body portion 71, it is unnecessary to provide piping inside the tank body portion 71 thus simplifying the structure of the reserve tank 66.

The mounting bracket 78 is formed on a front surface side of the intermediate portion of the filling portion 74 in an arcuate shape to close the opening side of the recessed portion 91 which is formed by indenting an outer peripheral portion of the filling portion 74 toward the inside. Further, a mounting hole 92 which penetrates the mounting bracket 78 in the lateral direction together with an inner surface of the recessed portion 91 is formed in the mounting bracket 78, wherein the reserve hose 65 is supported by inserting the reserve hose 65 into the mounting hole 92. With the provision of the mounting bracket 78 on the recessed portion 91 of the filling portion 74, a projecting amount of the mounting bracket 78 in front of the filling portion 74 can be suppressed thus allowing the filling portion 74 to be arranged in the vicinity of the rear surface of the radiator 58. In addition, the recessed portion 91 and the mounting bracket 78 are also molded at the time of performing the integral molding of the reserve tank 66.

As shown in FIGS. 4 and 5, a mounting bracket 93 having an approximately L-shaped cross section is mounted on an intermediate portion of a rear surface of the tank body portion 71 in a state wherein the mounting bracket 93 is aligned with the hose plug 75 in the lateral direction and projects from a rear surface thereof. The reserve hose 65 is sandwiched between the mounting bracket 93 and the rear surface of the tank body portion 71.

Figure 6:
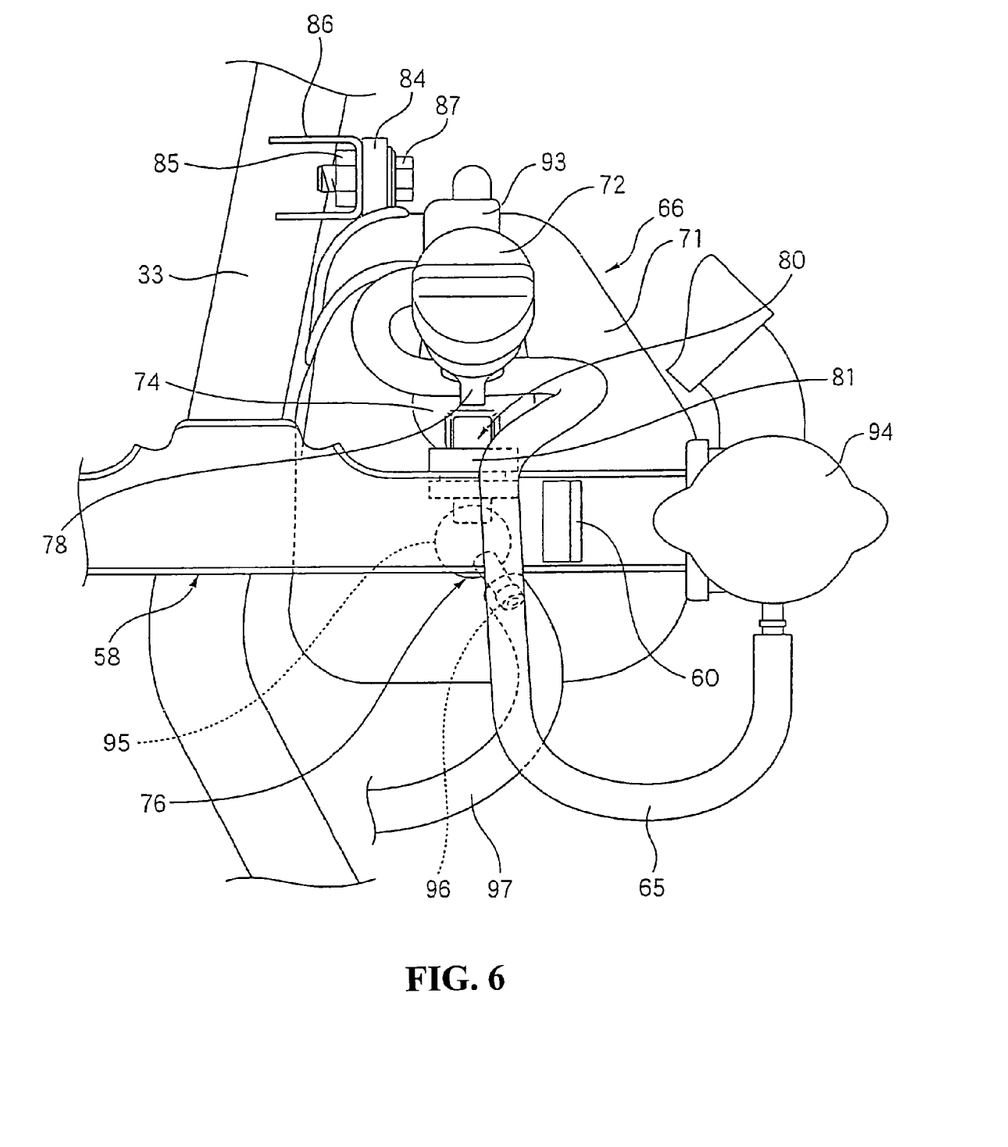
FIG. 6 is a plan view showing the structure in the vicinity of the reserve tank.

Accordingly, the reserve hose 65, which has one end portion thereof connected to the hose plug 75 is curved behind the mounting lug portion 84, is supported on the mounting bracket 93 and the mounting bracket 78 and, thereafter, extends upwardly along the rear surface of the radiator 58. Further, as shown in FIG. 6, the reserve hose 65 has another end thereof connected to an upper portion of the radiator 58 in the vicinity of the radiator cap 94. Accordingly, the reserve hose 65 is also pulled around in the frontwardly and upwardly directions along the inclined rear surface of the tank body portion 71. As shown in FIG. 1, the reserve hose 65 is arranged to follow a shape of the intermediate portion 64 of the left shroud 61L such that the reserve hose 65 is not exposed sideward with the use of the left shroud 61L.

The atmospheric pressure port 76 includes a base portion 95 which is formed into a dome shape by upwardly bulging an upper surface of the tank body portion 71 and a tubular connection portion 96 which extends obliquely in the frontward and upward direction from a front portion of the base portion 95. By fitting one end portion of the hose 97 which is opened to the atmosphere to the connecting portion 96, one end portion of the hose 97 is connected to the atmospheric pressure port 76. Although the atmospheric pressure port 76 is, as shown in FIG. 6, arranged at a position where the atmospheric pressure port 76 is overlapped to the radiator 58 in the longitudinal direction and the lateral direction, by extending the connection portion 96 obliquely in the frontward and upward direction, the interference between the hose 97 and the lower surface of the radiator 58 can be obviated thus facilitating the pull-around operation of the hose 97.

As has been explained heretofore, according to the reserve tank structure of this embodiment, the mounting bracket 78 which supports the intermediate portion of the reserve hose 65 is mounted on the filling portion 74 which extends upwardly from the tank body portion 71 and, at the same time, forms the water supply port 73 on the upper end thereof. Accordingly, it is unnecessary to consider the layout of the filling portion 74 and the mounting bracket 78 which obviates interference between the filling portion 74 and the mounting bracket 78. Thus, it is possible to enhance the degree of freedom in the layout of the filling portion 74 of the reserve tank 66 and the mounting bracket 78. Further, it is possible to reduce the number of the mounting brackets which are mounted on the tank body portion 71 to one mounting bracket 93. Thus, it is possible to also enhance the degree of freedom in layout of the peripheral members of the reserve tank 66.

Further, the recessed portion 91 is formed in the outer peripheral portion of the filling portion 74 and the mounting bracket 78 is mounted in the recessed portion 91. Thus, it is possible to suppress a projection amount of the mounting bracket 78 from the outer peripheral portion of the filling portion 74 to the outside. Accordingly, it is possible to arrange the mounting bracket 78 close to the radiator 58 which is arranged around the mounting bracket 78. Thus, it is possible to further enhance the degree of freedom in layout and, at the same time, it is possible to shorten a length of the reserve hose 65.

The support portion 80 is arranged in the vicinity of the mounting bracket 78 mounted on the filling portion 74 for supporting the reserve tank 66 on the vehicle-body-side radiator 58. Thus, it is possible to effectively suppress the swinging of the filling portion 74 and, at the same time, it is possible to effectively suppress the movement of the reserve hose 65.

In addition, the distal end portion 80a of the support portion 80 which is supported on the stay 79 of the vehicle-body-side radiator 58 includes a tapered portion 82 which is tapered toward a tip end thereof. Thus, it is possible to easily mount the support portion 80 on the stay 79. Further, the distal end portion of the support portion 80 includes the removal-preventing bulging portion 83. Thus, it becomes difficult to remove the support portion 80 from the stay 79.

Further, on the upper surface of the tank body portion 71, the atmospheric pressure port 76 which is in communication with an atmospheric side and maintains the pressure in the inside of the reserve tank 66 at an atmospheric pressure is mounted in a projecting manner in a state wherein the atmospheric pressure port 76 is directed in the obliquely upward direction. Thus, even when the reserve tank 66 is arranged below the radiator 58, it is possible to arrange the reserve tank 66 close to the radiator 58. At the same time, it is possible to facilitate the pull-around operation of the hose 97 when the hose 97 is connected to the atmospheric pressure port 76.

The present invention is not limited to the above-mentioned embodiment, and various modifications and improvements are conceivable when necessary.

For example, a shape of the mounting bracket of the present invention which is mounted on the filling portion is not limited to the shape of this embodiment. That is, provided that the mounting bracket can ensure the supporting of the reserve hose, the mounting bracket may be formed into an arbitrary shape or the mounting bracket may be formed separately from the filling portion.

Further, the reserve tank is not limited to the constitution of this embodiment in which the reserve tank is arranged on the left side and below the radiator. The reserve tank may be arranged at an arbitrary position. However it is preferable to arrange the reserve tank close to the radiator to shorten the length of the reserve hose.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A reserve tank structure for connecting a reserve tank to a radiator by way of a reserve hose, comprising:
   a tank body portion for reserving a coolant;
   a filling portion extending upwardly from the tank body portion and including a coolant supply port on an upper end thereof;
   a hose plug to which an end portion of the reserve hose is connected; and
   a mounting bracket for supporting the reserve hose;
   wherein the mounting bracket is mounted on the filling portion.

2. The reserve tank structure according to claim 1, wherein a recessed portion is formed in an outer peripheral portion of the filling portion and the mounting bracket is mounted in the recessed portion.

3. The reserve tank structure according to claim 1, wherein a support portion for supporting the reserve tank on a vehicle body side is arranged in the vicinity of the mounting bracket which is mounted on the filling portion.

4. The reserve tank structure according to claim 2, wherein a support portion for supporting the reserve tank on a vehicle body side is arranged in the vicinity of the mounting bracket which is mounted on the filling portion.

5. The reserve tank structure according to claim 3,
   wherein the support portion is supported on a vehicle-body-side stay and a distal end portion of the support portion includes a tapered portion which is tapered toward a tip end thereof and a removal-preventing bulging portion.

6. The reserve tank structure according to claim 4, wherein the support portion is supported on a vehicle-body-side stay and a distal end portion of the support portion includes a tapered portion which is tapered toward a tip end thereof and a removal-preventing bulging portion.

7. The reserve tank structure according to claim 1, wherein the reserve tank is arranged below the radiator and an atmospheric pressure port in communication with an atmospheric side maintains a pressure in the inside of the reserve tank at an atmospheric pressure, said atmospheric pressure port being mounted on an upper surface of the tank body portion in an obliquely and upwardly projecting manner.

8. The reserve tank structure according to claim 2, wherein the reserve tank is arranged below the radiator and an atmospheric pressure port in communication with an atmospheric side maintains a pressure in the inside of the reserve tank at an atmospheric pressure, said atmospheric pressure port being mounted on an upper surface of the tank body portion in an obliquely and upwardly projecting manner.

9. The reserve tank structure according to claim 3, wherein the reserve tank is arranged below the radiator and an atmospheric pressure port in communication with an atmospheric side maintains a pressure in the inside of the reserve tank at an atmospheric pressure, said atmospheric pressure port being mounted on an upper surface of the tank body portion in an obliquely and upwardly projecting manner.

10. The reserve tank structure according to claim 5, wherein the reserve tank is arranged below the radiator and an atmospheric pressure port in communication with an atmospheric side maintains a pressure in the inside of the reserve tank at an atmospheric pressure, said atmospheric pressure port being mounted on an upper surface of the tank body portion in an obliquely and upwardly projecting manner.

11. A reserve tank adapted to be connected to a radiator by a reserve hose, comprising:
    a tank body portion for holding a predetermined quality of fluid;
    a filling portion extending upwardly from the tank body portion and including a fluid supply port on an upper end thereof;
    a hose plug to which an end portion of the reserve hose is connected; and
    a mounting bracket for supporting the reserve hose, said mounting bracket being mounted on the filling portion for retaining the reserve hose relative thereto.

12. The reserve tank according to claim 11, wherein a recessed portion is formed in an outer peripheral portion of the filling portion and the mounting bracket is mounted in the recessed portion.

13. The reserve tank according to claim 11, wherein a support portion for supporting the reserve tank on a vehicle body side is arranged in the vicinity of the mounting bracket which is mounted on the filling portion.

14. The reserve tank according to claim 12, wherein a support portion for supporting the reserve tank on a vehicle body side is arranged in the vicinity of the mounting bracket which is mounted on the filling portion.

15. The reserve tank according to claim 13, wherein the support portion is supported on a vehicle-body-side stay and a distal end portion of the support portion includes a tapered portion which is tapered toward a tip end thereof and a removal-preventing bulging portion.

16. The reserve tank according to claim 14, wherein the support portion is supported on a vehicle-body-side stay and a distal end portion of the support portion includes a tapered portion which is tapered toward a tip end thereof and a removal-preventing bulging portion.

17. The reserve tank according to claim 11, wherein the reserve tank is arranged below the radiator and an atmospheric pressure port in communication with an atmospheric side maintains a pressure in the inside of the reserve tank at an atmospheric pressure, said atmospheric pressure port being mounted on an upper surface of the tank body portion in an obliquely and upwardly projecting manner.

18. The reserve tank according to claim 12, wherein the reserve tank is arranged below the radiator and an atmospheric pressure port in communication with an atmospheric side maintains a pressure in the inside of the reserve tank at an atmospheric pressure, said atmospheric pressure port being mounted on an upper surface of the tank body portion in an obliquely and upwardly projecting manner.

19. The reserve tank according to claim 13, wherein the reserve tank is arranged below the radiator and an atmospheric pressure port in communication with an atmospheric side maintains a pressure in the inside of the reserve tank at an atmospheric pressure, said atmospheric pressure port being mounted on an upper surface of the tank body portion in an obliquely and upwardly projecting manner.

20. The reserve tank according to claim 15, wherein the reserve tank is arranged below the radiator and an atmospheric pressure port in communication with an atmospheric side maintains a pressure in the inside of the reserve tank at an atmospheric pressure, said atmospheric pressure port being mounted on an upper surface of the tank body portion in an obliquely and upwardly projecting manner.

* * * * *